United States Patent

Kubillus et al.

Patent Number: 5,169,979
Date of Patent: Dec. 8, 1992

[54] CURING COMPONENT, AND THE USE THEREOF

[75] Inventors: Uwe Kubillus, Braunschweig; Gerhard Brindöpke, Frankfur am Main; Helmut Plum, Taunusstein, all of Fed. Rep. of Germany

[73] Assignee: Hoechst AG, Fed. Rep. of Germany

[21] Appl. No.: 620,283

[22] Filed: Nov. 30, 1990

Related U.S. Application Data

[63] Continuation of Ser. No. 251,669, Sep. 29, 1988, abandoned.

[30] Foreign Application Priority Data

Oct. 1, 1987 [DE] Fed. Rep. of Germany ....... 3733182

[51] Int. Cl.$^5$ ................ C07C 69/66; C07C 205/01; C07C 255/01
[52] U.S. Cl. .................................... 560/176; 558/440; 558/441; 558/442; 560/155; 560/156; 560/169; 560/170; 560/171; 560/190; 560/198; 564/199; 568/307
[58] Field of Search ............... 560/176, 198, 155, 156, 560/169, 170, 171; 525/327.003; 558/442, 440; 568/307; 564/199

[56] References Cited

U.S. PATENT DOCUMENTS 4,567,004 1/1986 Blank et al. ..................... 564/199

Primary Examiner—Paul R. Michl
Assistant Examiner—Tae H. Yoon
Attorney, Agent, or Firm—Bierman and Muserlian

[57] ABSTRACT

The invention relates to a curing component (A) containing active CH groups, which contains at least two groups of the formula (I)

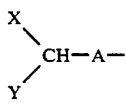

(I)

or structural units of the formula (I') or (I'')

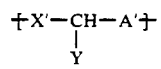

(I')

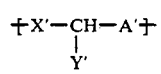

(I'')

in which:
A denotes

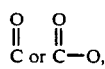

X and Y are identical or different and denote

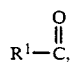

$CO_2R^1$, CN, $NO_2$, $CONH_2$, $CONR^1H$ or $CONR^1R^1$, where the $R^1$ radicals may be identical or different and represent a hydrocarbon radical, preferably an alkyl radical having 1 to 12 carbon atoms, which may also be interrupted by oxygen or an N-alkyl radical, with the proviso that only one of the two radicals X and Y may represent the $NO_2$ group;

A' denotes

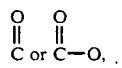

X' and Y' are identical or different and denote

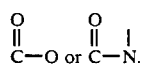

Curable mixtures of (A) and a Michael acceptor (B) and, if appropriate diluents and customary additivies cure rapidly even at low temperatures and are suitable, in particular for surface-coating preparations.

5 Claims, No Drawings

CURING COMPONENT, AND THE USE THEREOF

This is a continuation of Ser. No. 251,669 filed Sep. 29, 1988 now abandoned.

The curing of polyol resins using polyisocyanates is known. Some of these systems have proven very successful, and some also have so-called cold-curing properties.

For environmental protection and industrial safety reasons, however, it is desirable to have available isocyanate-free surface-coating systems which, taking into account economic factors, cure as far as possible at room temperature and give high-quality coating films.

An isocyanate-free surface-coating system, based on the Michael addition, is known, for example, from German Patent 835,809. In this, substances which contain at least two methylene or methine groups activated by electron-withdrawing groups (inter alia acetoacetates, acetoacetamides and cyanoacetates) are employed as CH-active compounds (Michael donors). Compounds which contain at least two double bonds activated by an electron-withdrawing group (inter alia esters or amides of acrylic acid and/or methacrylic acid) are used as unsaturated substances (Michael acceptors). In practice, however, relatively high temperatures are necessary for complete curing of the above systems.

The same curing principle is used in EP-OS 161,679, where malonic ester group-containing oligomers or polymers function as CH-active substances. At room temperature, however, the crosslinking reaction again proceeds relatively slowly here; after one day, the films still have inadequate chemical resistance and hardness. A similar disadvantage is exhibited by the binder system in U.S. Pat. No. 4,408,018, which is likewise based on the Michael addition.

An alternative curing principle is used in the condensation of silanols, which form during curing of silicon-containing polymers whose hydrolysis-sensitive groups on the silicon atom react with atmospheric moisture; in this respect, cf., inter alia, EP Offenlegungsschriften 50,249, 159,716 and 182,316. The relatively complex preparation of the silicone-containing starting compounds and the dependency of the properties of the coating films on the relatively atmospheric humidity are disadvantageous in this system. In addition, the polycondensation may commence, under the influence of atmospheric moisture, even before processing of the surface-coating material, which results in skin formation or in precipitation in the coating material.

Similar problems are also exhibited by the system of EP Offenlegungsschrift 34,720, which is based on an oxazolidine group-containing acrylate resin, where water or atmospheric oxygen are likewise used as curing agents.

Finally, in German Offenlegungsschrift 3,541,140, a curing product made from olefinically unsaturated compounds as binders and hydrogen-active compounds having a methanetrimonoamide structure as curing agents is described. A disadvantage is that relatively large amounts of polyisocyanates, which are hazardous to health, are required for the preparation of the curing agent. In addition, the carboxamide group-containing curing agents are not in all cases perfectly soluble in the customary surface-coating solvents. A further disadvantage is the great scratch sensitivity of the films, which is probably attributable to the fact that, due to the preparation process, the curing agents still contain relatively large amounts of unreacted malonic esters, which do not react with the olefinically unsaturated binders.

There is therefore a demand for an isocyanate-free cold-curing system which does not have the disadvantages above and which results in cured products the properties of which compare well with the known isocyanate-containing systems.

The invention therefore relates to a curing component (A) containing active CH groups, which contains at least two groups of the formula (I)

or structural units of the formula (I') or (I'')

in which:
A denotes

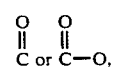

the latter group being bonded to the CH group via the carbon atom;

X and Y are identical or different and denote

$CO_2R^1$, CN, $NO_2$, $COHN_2$, $CONR^1H$ or $CONR^1R^1$, where the $R^1$ radicals may be identical or different and represent a hydrocarbon radical, preferably an alkyl radical having 1 to 12, preferably 1 to 6, carbon atoms, which may also be interrupted by oxygen or an N-alkyl radical, with the proviso that only one of the two radicals X and Y may represent the $NO_2$ group;

A' denotes

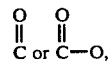

where the latter group is bonded to the CH group via the carbon atom;

X' and Y' are identical or different and denote

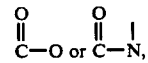

with the proviso that, when A' and X' denote

the radical Y' is preferably not

In addition, the invention relates to a process for the preparation of this curing component (A), to curable mixtures which contain this curing component (A), and to the use of these curable mixtures as surface-coating preparations, in particular as automobile repair paints.

The number of groups (I) in the curing agent according to the invention is preferably 2 to 200 and in particular 2 to 10, the larger numerical value relating to oligomeric of polymeric products and representing mean values here.

The curing component (A) preferably has the formula (II)

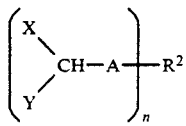

(II)

in which X, Y and A have the above meaning, $R^2$ represents the radical of a polyol $R^2(OH)_n$ (A =

or the radical $R^2$ of a polycarboxylic acid $R^2(CO_2H)_n$ (A =

and n denotes at least two, preferably 2 to 200, in particular 2 to 10. In the case of oligomeric or polymeric curing components, these numerical data are again mean values.

Furthermore preferred are curing components which are obtained by transesterification of compounds of the formula (III) or of the formula (VI)

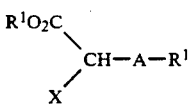

(III)

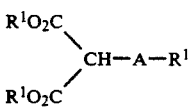

(IV)

using polyols $R^2(OH)_n$, where X, A and $R^1$ have the above meaning.

The abovementioned polyols $R^2(OH)_n$ may be polyhydric alcohols, preferably having 2 to 12, in particular 2 to 6, carbon atoms. Examples of these are: ethylene glycol, 1,2- and 1,3-propylene glycol, 1,4- and 2,3-butylene glycol, di-β-hydroxyethylbutanediol, 1,6-hexanediol, 1,8-octanediol, neopentyl glycol, 1,6-cyclohexanediol, 1,4-bis(hydroxymethyl)cyclohexane, 2,2-bis(4-hydroxycyclohexyl)propane, 2,2-bis(4-(α-hydroxyethoxy)phenyl)propane, 2-methyl-1,3-propanediol, glycerol, trimethylolpropane, 1,2,6-hexanetriol, 1,2,4-butanetriol, tris-(β-hydroxyethyl) isocyanurate, trimethylolethane, pentaerythritol and the hydroxyalkylation products thereof, furthermore diethylene glycol, triethylene glycol, tetraethylene glycol, polyethylene glycols, dipropylene glycol, tripropylene glycol, polypropylene glycols, dibutylene glycol, polybutylene glycols and xylylene glycol. It is also possible to employ polyesters, which are obtained from or using lactones, for example ε-caprolactone, or hydroxycarboxylic acids, such as, for example, hydroxypivalic acid, ω-hydroxydecanoic acid, ω-hydroxycaproic acid or thioglycolic acid. The index n in the above formula (II) preferably represents 2 to 4 in the case of polyhydric alcohols of this type.

The polyol may alternatively be an oligomeric or polymeric polyol compound (polyol resin) whose molecular weight $\bar{M}w$ (weight average, determined by means of gel chromatography; polystyrene standard), is usually in the range from about 300 to about 50,000, preferably about 5,000 to about 20,000. In special cases, however, the molecular weight may be 100,000 or more. Suitable oligomers/polymers here are polymerization product, polycondensates or polyaddition compounds. The hydroxyl number is generally 30 to 250, preferably 45 to 200 and in particular 50 to 180, mg of KOH/g. These OH group-containing compounds may optionally contain further functional groups, such as carboxyl groups.

Examples of polyols of this type are polyether polyols, polyacetal polyols, polyester amide polyols, polyamide polyols, epoxy resin polyols or the reaction products thereof with $CO_2$, phenolic resin polyols, polyurea polyols, polyurethane polyols, cellulose esters and cellulose ether polyols, partially hydrolysed homopolymers and copolymers of vinyl esters, partially acetalated polyvinyl alcohols, polycarbonate polyols, polyester polyols or acrylate resin polyols. Polyether polyols, polyester polyols, acrylate resins and polyurethane polyols are preferred. Polyols of this type, which may also be employed in mixtures, are described, for example, in German Offenlegungsschrift 3,124,784.

Examples of polyurethane polyols are produced from the reaction of diisocyanates and polyisocyanates with an excess of diols and/or polyols. Suitable isocyanates are, for example, hexamethylene diisocyanate, isophorone diisocyanate, toluyl diisocyanate and isocyanates formed from three moles of a diisocyanate, such as hexamethylene diisocyanate or isophorne diisocyanate, and biurets produced from the reaction of three moles of a diisocyanate with one mole of water. Suitable polyurea polyols can be obtained in a similar way by reacting diisocyanates and polyisocyanates with equimolar amounts of aminoalcohols, for example ethanolamine or diethanolamine.

Examples of polyester polyols are the known polycondensates made from dicarboxylic acids or polycarboxylic acids or the anhydrides thereof, such as phthalic anhydride, adipic acid etc., and polyols, such as ethylene glycol, trimethylolpropane, glycerol etc.

Suitable polyamide polyols can be obtained in similar fashion to the polyesters by replacing the polyols, at least partly, by polyamines, such as isophoronediamine, hexamethylenediamine, diethylenetriamine etc.

Examples of polyacrylate polyols or OH group-containing polyvinyl compounds are the known copolymers made from hydroxyl group-containing (meth)acrylic esters or vinyl alcohol and other vinyl compounds, such as, for example, styrene or (meth)acrylic esters.

The polycarboxylic acids $R^2(CO_2H)_n$ above where n is preferably 2 to 4 here may be of an aliphatic, cycloaliphatic, aromatic and/or heterocyclic nature and optionally substituted, by halogen atoms, and/or saturated. Examples of such carboxylic acids and derivatives thereof which may be mentioned are: succinic acid, adipic acid, suberic acid, azelaic acid, sebacic acid, phthalic acid, terephthalic acid, isophthalic acid, trimetallic acid, pyromellitic acid, tetrahydrophthalic acid, hexahydrophthalic acid, di- and tetrachlorophthalic acid, endomethylenetetrahydrophthalic acid and its hexachloro derivative, glutaric acid, maleic acid, fumaric acid, dimeric and trimeric fatty acids, such as oleic acid, optionally mixed with monomeric fatty acids or cyclic monocarboxylic acids, such as benzoic acid, p-tert.-butylbenzoic acid or hexahydrobenzoic acid, and furthermore the products of the reaction of the abovementioned polyols $R^2(OH)_n$ with cyclic carboxylic anhydrides.

The curing component (A) according to the invention is a liquid of varying viscosity, depending on the nature of the polyol or polycarboxylic acid component, or a solid which is substantially soluble, at least in the customary surface-activating solvents, and preferably contains less than 5% by weight, in particular less than 1% by weight, of crosslinked components. The CH equivalent weight, which is a measure of the number of groups (I) or structural units (I')/(II'') in (A), is generally between 100 and 5,000, preferably 200 and 2,000, and the mean molecular weight $\overline{M}_w$ is generally between 1,000 and 100,000, preferably between 2,000 and 50,000 (determined by gel chromatography; polystyrene standard).

It is also possible to employ mixtures of the above compounds as curing components (A).

Curing components (A) can be prepared by several routes. Thus, for example, the synthesis can proceed from compounds (V)

which are acylated using chlorides of monobasic or polybasic carboxylic acids or carboxylated using chloroformates of monohydric or polyhydric alcohols or nitrated, and the products thus obtained are if appropriate, transesterified using polyols or transamidated using polyamines. In the case of nitration, at least one of the two radicals X and Y must denote the $-CO_2R^1$ radical, and neither of these radicals may represent an $NO_2$ group.

Examples of compounds of the formula (V) are: dialkyl malonates of alcohols having 1 to 12, preferably 1 to 10, carbon atoms, such as dimethyl malonate, diethyl malonate, diisopropyl malonate and dioctyl malonate, the corresponding esters of cyanoacetic acid, such as, for example, ethyl cyanoacetate or hexyl cyanoacetate; the corresponding esters of acetoacetic acid, such as ethyl acetoacetate; diketones, such as acetylacetone; and malononitrile or malonic diamides or monoamides.

The compounds (V) are acylated in a known manner using acid chlorides of monocarboxylic acids having 1-10, preferably 1 to 6 carbon atoms, or using acid chlorides of polycarboxylic acids preferably having 2 to 10 carbon atoms. Examples of appropriate polycarboxylic acids are described above.

For carboxylation, the compounds (V) are reacted with chloroformic esters of monohydric or polyhydric alcohols of the abovementioned type, such as, for example, methyl chloroformate, ethyl chloroformate or 1,6-hexanediol bischloroformate.

For acylation or carboxylation, the compound (V) is initially reacted with alkali metal or alkaline earth metal alkoxides, preferably sodium alkoxide, potassium alkoxides or magnesium alkoxides, such as methoxides or ethoxides, and the products are reacted with acyl chlorides $(R^2(COCl)_m$ (m=1-200) of monobasic or polybasic carboxylic acids or with chloroformic esters $R^2(O-COCl)_m$ of monohydric or polyhydric alcohols. This reaction expediently proceeds in inert solvents, such as ethers and aliphatic or aromatic hydrocarbons, preferably diethyl ether, tetrahydrofuran, dioxane, diethylene glycol dimethyl ether, toluene or xylene, or appropriate mixtures. In place of the above alkoxides, the free metals can, less preferably, be reacted with (V).

The nitration can be carried out, for example, by reacting the compounds (V) with fuming nitric acid or by oxidizing the corresponding nitroso compounds by methods known from the literature, for example at temperatures from 10° to 25° C. with or without solvent.

It is necessary to transesterify the products obtained above using polyols of the type mentioned above in order to polyfunctionalize the curing component. This transesterification, which can be omitted, for example, in the acylation of alcohols, is carried out, for example, by heating the acylated, carboxylated or nitrated compounds (V) with the polyols, such as polyhydric alcohols, to temperatures from 80° to 200° C., preferably 100° C. to 160° C., and removing the monofunctional alcohol by distillation, if appropriate under reduced pressure. The reaction usually proceeds without catalysts. However, the known esterification catalysts, such as metal salts of organic acids, for example the acetates, octanoates or naphthanates of tin, zinc, lead, iron, copper, chromium and cobalt, and dibutyltin oxide, may be added in amounts from 0.1 to 1.0% by weight to provide acceleration. Dibutylin dilaurate is particularly preferred. Through a suitable choice of the weight ratio of the reaction participants in the transesterification, the formation of crosslinked esters of polyhydric alcohols can be suppressed in favor of formation of the straight-chain or branched esters desired. In addition, chain terminators, i.e. compounds which react in a monofunctional manner under the reaction conditions, such as monoalcohols, monoamines or monoesters, which are preferably non-volatile, may be added to the batch for this purpose, and also to limit the molecular weight.

The transamidation using polyamines or polyamino alcohols can be carried out in the same way. Suitable polyamines are, for example, alkylenediamines, such as ethylenediamine and its homologs, or polyalkylenepolyamines, such as diethylenetriamine or triethylenetetramine, or cycloaliphatic polyamines, such as piperazine, or polyoxyalkylenepolyamines. Suitable polyamino alcohols are, for example, hydroxyethyldiethylenetriamine or bishydroxyethyldiethylenetriamine, or the products of the reaction of cyclic carbonates with polyamines.

In another method of preparing the curing components according to the invention, compounds of the formula (VI)

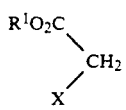 (VI)

in which $R^1$ and X have the above meanings, are, in the above-described way, transesterified using polyols or transamidated using polyamines, and these transesterification products are subsequently acylated in the manner described using chlorides of monobasic and polybasic carboxylic acids or carboxylated using chloroformic esters of monohydric or polyhydric alcohols or nitrated using nitric acid.

In the transesterification or transamidation of the compounds (VI) or the acylated, carboxylated or nityrated compounds (V), the reactants are normally employed in amounts such that at least one hydroxyl or amino group is transferred to (VI) or to the acylated, carboxylated or nitrated compound (V).

The curing component (A) according to the invention is employed in curable mixtures together with compounds (B) which contain at least two groups which are capable of Michael addition, i.e. groups which contain double bonds activated by at least one electron-withdrawing group (Michael acceptor). Suitable compounds (B) are described, for example, in German Patent 835,809, in U.S. Pat. No. 4,403,018 and in European Offenlegungsschriften 161,679 and 224,158, to which reference is made here.

The compounds (B) preferably contain at least two groups of the formula (VII)

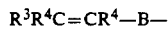 (VII)

in which:
$R^3$ denotes hydrogen or a hydrocarbon radical, preferably an alkyl radical, having 1 to 12, preferably 1 to 4, carbon atoms, such as the methyl, ethyl, n-propyl, iso-propyl, n-butyl, or tert.butyl group;
$R^4$ are identical or different and denote hydrogen, a hydrocarbon radical, preferably an alkyl radical, having 1 to 10, preferably 1 to 4, carbon atoms, an ester group $CO_2R^1$, or a —CH—, —$NO_2$—, —$SO_2$—, —$CONHR^1$— —$CONR^1R^1$ or —$COR^1$ group where $R^1$ has the above meaning; and
B denotes

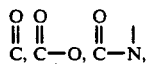

where the two latter groups are bonded to the $CR^4$ group via the carbon atom.

In the $R^3R^4C$ group above, $R^3$ and $R^4$ preferably each represent hydrogen.

The groups (VII) above are linked indirectly to one another. A suitable indirect linkage here is, for example, a hydrocarbon radical, but preferably the radical of a polyhydric alcohol $R^1(OH)_n$ or of a polyvalent amine or amino alcohol. This indirect linkage may also be part of the chain of an oligomer and/or polymer, i.e. the groups (VII) may be present in the side chains of the oligomer or polymer or form these side chains.

In the specific embodiment, the compound (B) has the formula (VIII)

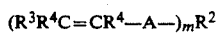 (VIII)

in which $R^3$, $R^4$ and A have the meaning in the formula (VII), $R^2$ corresponds to the meaning in the formula (II) and m denotes at least 2, preferably 2 to 200.

The $R^3R^4C=CR^4$—A— group (VII) may be derived, for example, from a mono- or polyunsaturated mono- or dicarboxylic acid having 2 to 20, preferably 3 to 10, carbon atoms.

Examples of carboxylic acids of this type are crotonic acid, citraconic acid or the anhydride thereof, sorbic acid, fumaric acid, mesaconic acid, substituted and unsubstituted cinnamic acids, dihydrolevulinic acid, malonic mononitrile, α-cyanoacrylic acid, alkylidenemalonic acid, alkylideneacetoacetic acid, preferably acrylic acid, methacrylic acid and/or maleic acid, or its anhydride. The possible linking of the Michael acceptor to the connecting member, such as a polymeric support, via group A, but alternatively via the radical $R^4$, can take place via ester, amide, urethane or urea groups.

Corresponding to the above, the groups of the formula (VII) may be bonded to the radical of a polyol, a polyamine, a polyamide or a polyiminoamide, where this radical may also be oligomeric or polymeric.

Suitable glycols here are in principle the same as mentioned above in connection with the Michael donor, i.e. polyhydric alcohols or oligomeric or polymeric polyol compounds, for example polyether polyols, polyester polyols, acrylate resin polyols and polyurethane polyols.

Suitable polyols here are in principle the same as mentioned above in connection with the Michael donor, i.e. polyhydric alcohols or oligomeric or polymeric polyol compounds, for example polyether polyols, polyester polyols, acrylate resin polyols and polyurethane polyols.

Suitable amino group-containing supports (polyamines) are, for example, the abovementioned alkylenediamines and the oligomers thereof, such as ethylenediamine, propylenediamine, butylenediamine, diethylenetriamine, tetramines and higher homologs of these amines, furthermore amino alcohols, such as diethanolamine or the like.

The examples of compounds (B) which may be mentioned here are: alkylglycol di(meth)acrylate, such as ethylene glycol diacrylates, diethylene glycol diacrylate, propylene glycol diacrylate, trimethylene glycol diacrylate, neopentyl glycol diacrylate, 1,3-butylene glycol diacrylate, 1,4-butylene glycol diacrylate, 1,6-hexamethylene glycol diacrylate, 1,10-decamethylene glycol diacrylate, trimethylolpropane triacrylate, pentaerythritol tetraacrylate, pentaerythritol triacrylate and the corresponding methacrylates.

In addition, the acryloxy group may be bonded to polymers, for example condensation polymers, such as polyesters, or polyaddition polymers, such as polyurethanes, polyethers or vinyl polymers, such as glycidyl (meth)acrylate copolymers. Examples which may be mentioned here are urethane acrylates, obtained by reacting polyisocyanates, such as hexamethylene diisocyanate, with hydroxyalkyl acrylates, such as hydroxyethyl acrylate, or by reacting hydroxyl group-containing polyesters, polyethers or polyacrylates with polyisocyanates and hydroxyalkyl acrylates, urethane acrylates, obtained by reacting caprolactonediol or -triol with polyisocyanates and hydroxyalkyl acrylates, polyether acrylates, obtained by esterifying hydroxypolyethers using acrylic acid, polyester acrylates, obtained by esterifying hydroxypolyesters using acrylic acid, and polyacrylates, obtained by reacting acrylic acid with vinyl polymers containing epoxide groups, for example copolymers with glycidyl (meth)acrylate or vinyl glycidyl ether.

Mixtures of the compounds above are also possible as component (B).

The C=C equivalent weight of component (B) is generally between 85 and 1,800, preferably between 180 and 1,200, and the molecular weight $\overline{M}w$ is generally between 170 and 50,000, preferably 500 and 30,000.

The mixing ratio of the two components (A) and (B) depends on the number of available C—H—acidic hydrocarbon atoms in the curing component and on the number of unsaturated groups in the $\alpha,\beta$-unsaturated compounds. Since the reactive groups can be determined titrimetrically, precise stoichiometric mixing ratios can be produced. In general, the donor:acceptor group equivalent ratio is 2:1 to 1:2, in particular about (0.8–1.2):1 to about 1:(0.8–1.2). In this way, an adequate crosslinking density is generally achieved.

In order to accelerate the curing reaction correspondingly, the curable mixtures according to the invention contain the catalysts which are known for the Michael addition, in particular Lewis bases or Brönstedt bases. Suitable catalysts can be found, for example, in European Offenlegungsschrift 224,158, to which reference is again made here.

Catalysts which may be mentioned here are, for example, sterically hindered tertiary amines, such as, for example, 1,4-diazabicyclo(2.2.2)octane (DABCO), cyclic amidines, such as, for example, 1,8-diazabicyclo(5.4.- 0)undec-7-ene (DBU), 1,4-diazabicyclo(4.3.0)non-5-ene (DBN) inter alia, guadidines, such as, for example N,N,N,N-tetramethyl-guanidine, quarternary ammonium salts, such as alkylaryl-and/or benzylammonium fluoride, if appropriate in combination with tetraalkoxysilanes; examples of quaternary ammonium salts of this type which may be mentioned here are: benzyltrimethylammonium fluorides and tetrabutylammonium fluoride; in addition, the corresponding hydroxides and carbonates of quaternary ammonium salts, such as, for example, alkylbenzyldimethylammonium hydroxide, alkyltrimethylammonium hydroxide (alkyl=$C_{16}$–$C_{22}$), benzyltrimethylammonium hydroxide and tetrabutylammonium hydroxide, may be used. The ammonium salts mentioned can be used alone or mixed or in combination with tertiary aliphatic amines, such as, for example, triethylamine, N-methyldiethanolamine etc. Further examples here are strong bases from the group comprising the metal alkoxides, such as, for example, lithium butoxide, sodium methoxide and potassium methoxide, which can be employed with or without crown ethers.

A further important group of catalysts in tertiary phosphines, such as, for example, tris-2-cyanoethylphosphine, trisdiethylaminomethylphosphine, trisdimethylaminomethylphosphine and trishydroxymethylphosphine, or trisphenylphosphine, tris-p-tolylphosphine, tris-o-anilylphosphine, phenyldi-o-anisylphosphine, diphenyl-p-anisylphosphine, diphenyl-o-anisylphosphine, diphenyl-p-dimethylaminophenylphosphine, methyldiphenylphosphine, methylditolylphosphine, ethyldi-p-anisylophosphine, (diethylaminomethyl)diphenylphosphine or $\alpha,\alpha$-dimethylbenzyliminotris(dimethylamino)phosphorane, $\alpha,\alpha$-dimethylbenzyliminomethyldiphenylphosphorane, t-butyliminotriphenylphosphorane, preferably $\alpha,\alpha$-dimethylbenzylimino-tri-butylphosphorane.

The amount of catalyst is generally 0.01–5% by weight, preferably 0.2–3% by weight, relative to the total solids content of the starting material. It may be varied depending on the reactivity of the curing components and on the pot time and curing duration or temperature intended.

The curable mixtures according to the invention exhibit pot times which vary, depending on the choice of compound (A) and (B) and on the type and quantity of the catalyst or catalyst combination, between 5 minutes and about 12 horus. High processing reliability is thereby ensured.

The curable mixture according to the invention may, if appropriate, contain a diluent, such as customary solvents which do not interfere with the Michael addition. The catalyst may thereby be better distributed or its activity may be increased. Examples which may be mentioned here are: halogenated hydrocarbons, ethers, such as diethyl ether, 1,2-dimethoxyethane, tetrahydrofuran or dioxane; ketones, such as, for example, methyl ethyl ketone, acetone, cyclohexanone and the like; alcohols, such as methanol, ethanol, propanol, butanol and benzyl alcohol, (cyclo)aliphatic and/or aromatic hydrocarbons, such as hexane, heptane, cyclohexane, benzene, toluene, the various xylenes and aromatic solvents in the boiling range from about 150° to 180° C. (higher-boiling mineral oil fractions, such as ®Solvesso). The solvents may be employed here individually or mixed.

In addition, customary additives, such as, for example, the customary paint additives, may be present in the curable mixture according to the invention. Examples which may be mentioned here are: pigments (iron oxides, lead oxides, lead silicates, titanium dioxide, barium sulfate, zinc oxide, zinc sulfide, phthalocyanine complexes etc.), pigment pastes, antioxidants, (UV) stabilizers, flow-control agents, thickeners, defoamers and/or wetting agents, reactive thinners, fillers (talc, mica, kaolin, chalk, quartz powder, asbestos powder, slate powder, various silicas, silicates etc.), additional curing agents and addition curable compounds, and the like. Addition of these additives to the mixture may be delayed until just before processing.

In order to produce the curable mixtures according to the invention, components (A) and (B) and, where appropriate, additionally the diluent and the additives, are mixed with one another. In the case of low-viscosity components, this can take place in the solid phase, with the mixture being heated to elevated temperatures if necessary. Higher-viscosity products, if the curable mixtures are not to be employed as powder paints, are dissolved or dispersed in the diluents mentioned before mixing.

Curing of the mixtures according to the invention proceeds very quickly and generally takes place at −10° to 100° C., preferably 0° to 80° C. For example, products of good hardness are obtained after 8 to 24 hours at room temperature or after only 0.5 to 1 hour at 60° C. The curing reaction can be carried out in one step, for example by working with equivalent proportions of components (A) and (B). The pot time and the properties of the product depend here on the process conditions, i.e. on the type and quantity of the starting materials, the metering rate of the catalyst, the temperature program, etc. Thus, the elasticity of the crosslinked product can be controlled within a tolerance range, for example by means of the chain length of the oligomers and/or polymers employed for (A) and (B). Although curing is generally carried out batchwise, the scope of the invention also includes carrying out the mixing of the components and the performance of the reaction continuously, for example by means of an automatic painting machine.

As a consequence of their favorable properties—above all the rapid curing, even at low temperatures and even at high atmospheric humidity, and the high pendulum hardness, the high gloss and the good chemical resistance of the coatings—the mixtures according to the invention have a wide variety of applications in industry, for example for the production of moldings (casting resins) for tool construction or for the production of coatings and/or intermediate coatings on a wide variety of substrates, for example on those of an organic or inorganic nature, such as wood, wood fiber materials (wood sealing), textiles of natural or synthetic origin, plastics, glass, ceramics, building materials, such as concrete, fiberboard, synthetic stones, but in particular on metal. In addition, the mixtures according to the invention can be employed as components of adhesives, cements, lamination resins, synthetic resin cements and, in particular, as components of paints and surface coatings for coating industrial objects, household appliances, furniture and in the building industry, such as, for example, refrigerators, washing machines, electrical appliances, windows and doors. Application can take place in a known manner, such as by brushing, spraying, dipping or electrostatically. A preferred field of application for the mixtures according to the invention is in the production of automotive paints (base coats and/or top coats) and in particular of automobile repair paints. In this case xylene resistance and thus simultaneously good resistance to premium grade gasoline is important; in addition, automobile repair paints should exhibit good curing at room temperature, and release of environmental pollutants should only be low. These prerequisites are substantially fulfilled here.

In the examples below, % in each case denotes % by weight and P in each case denotes parts by weight.

Examples

A Preparation of the curing components (A) (Michael donor)

(1) 858.4 P of triethyl methanetricarboxylate and 436.6 P of 1,6-hexanediol were mixed and heated to 140° C. under nitrogen. At this temperature, ethanol was firstly removed by distillation under atmospheric pressure followed by a mixture of ethanol and triethyl methanetricarboxylate in vacuo. A total of 362 g were distilled off. 933 g of a colorless, viscous liquid having a mean molecular weight ($M_w$; polystyrene standard) of 70,000 and an equivalent weight of 304 g/mol remained as the residue.

(2) 806.5 g of diethylmonomethyl methanetricarboxylate and 340.9 g of 1,4-butanediol were reacted analogously to Example 1). After removing 259 g of volatile components by distillation, 889 g of a pale yellow viscous liquid having a mean molecular weight of 20,000 and an equivalent weight of 427 g/mol remained.

(3) 858 g of triethyl methanetricarboxylate and 440 g of trimethylolpropane were reacted at 140° C. analogously to Example 1). A total of 600 g of volatile components were removed by distillation. A colorless, viscous liquid having a mean molecular weight of 4,300 and an equivalent weight of 295 g/mol were obtained.

(4) 404 g of diethyl acylmalonate and 231 g of 1,6-hexanediol were reacted analogously to Example 1). After 101 g of volatile components had been removed by distillation, 534 g of a colorless, slightly viscous liquid having a mean molecular weight of 1,700 and an equivalent weight of 268 g/mol remained.

(5) 404 g of diethyl acylmalonate and 80 g of trimethylolpropane were reacted analogously to Example 1). A total of 158 g of volatile components were removed by distillation. 326 g of a colorless, slightly viscous liquid having a mean molecular weight of 3,200 and an equivalent weight of 209 g/mol remained as the residue.

(6) 103.31 g of methyl diacetoacetate and 26.84 g of trimethylolpropane were reacted at 106° C. analogously to Example 1). After 60.2 g of volatile components had been removed by distillation, 76.2 g of a pale yellow, viscous liquid having an equivalent weight of 235 remained.

(7) 25.04 P of magnesium turnings, 25 ml of dry ethanol and 1 ml of tetrachloromethane were introduced into a 2 liter four-necked flask equipped with stirrer, reflux condenser and dropping funnel, and salt formation was initiated by warming carefully. 160.17 P of diethyl malonate, dissolved in 80 ml of ethanol, where added dropwise at a rate such that the reaction did not become too vigorous. During the reaction time, a total of 300 ml of dry diethyl ether was added in portions. After all the malonate had been added dropwise, the reaction mixture was kept under reflux for 2 hours until the magnesium turnings had substantially dissolved. 127 P of 1,6-hexanediol bischloroformate, dissolved in 100 ml of ether, were then added dropwise over the course of 2 hours, and the mixture was left to stand overnight at room temperature. The batch was hydrolysed using 60 ml of acetic acid, dissolved in 300 ml of water, the organic phase was washed with water until neutral and dried over sodium sulfate, the organic solvent was removed on a rotary evaporator, and the clear, oily residue was crystallized by rapid cooling and trituration. 97.3 P of diethyl 1,6-hexanediolbismethanetricarboxylate were obtained as a crystalline solid of melting point 42° C. The acid number was 230.

(8) 287.2 P of diethyl nitromalonate and 247.9 P of trimethylolpropane were mixed at room temperature under nitrogen, and the mixture was slowly heated to a maximum of 140° C., whereupon ethanol began to distill off. After 5 hours, the volatile components were removed at a temperature of 140° C. in a water-pump vacuum, and a total of 37.4 g of a viscous, yellow oil having an equivalent weight of 441 g were obtained; the mean molecular weight was 1,646.

(9) 360 P of diethyl malonate and 50.25 P of trimethylolpropane were mixed under nitrogen, the mixture was heated to 160° C., 39 P of ethanol were removed by distillation over the course of 5 hours, all the volatile components were subsequently removed at 120° C. in a water-pump vacuum, and 179 P of a colorless oil whose mean molecular weight was 3,600 were obtained. 100 P of the reaction product obtained, dissolved in 40 P of dry ethanol, were added dropwise over the course of 2 hours to 12.52 P of magnesium turnings, 12.5 ml of dry ethanol and 0.5 ml of tetrachloromethane, and the mixture was subsequently kept under reflux for a further 3 hours until the magnesium turnings had substantially dissolved. 52 g of ethyl chloroformate, dissolved in 150 ml of ether, were subsequently added dropwise over the course of 2 hours, and the mixture was left to react at room temperature for 2 days. After hydrolysis using water and acetic acid (5:1) until the mixture was slightly acidic, the organic phase was separated off and dried over Na₂SO₄, and the volatile components were removed in a water-pump vacuum. 202.5 g of a carboxyethylated product having an equivalent weight of 708 g were obtained.

(10) 2,090.1 g of triethyl methanecarboxylate, 709.7 g of 1,4-butanediol and 450.0 g of a polycaprolactonediol having a molecular weight of 400 g/mol were mixed, the mixture was heated at 125°-135° C. for 7 hours under nitrogen. A total of 697.5 g of ethanol were removed by distillation. 2,552.3 g of a colorless, viscous liquid having an equivalent weight of 300 g/mol and a mean molecular weight ($\overline{M}_w$; polystyrene standard) of 8,300 g/mol remained as the residue.

(11) 85.9 g of triethyl methanetricarboxylate were heated at 135°-140° C. for 2 hours under nitrogen together with 95.85 g of a polyether polyol (®Pluracol TP 440, BASF). During this time, a total of 19.34 g of ethanol distilled off. 162.41 g of a colorless, highly viscous liquid having an equivalent weight of 446 g/mol and a mean molecular weight ($\overline{M}_w$; polystyrene standard) of 7,400 g/mol remained.

B Preparation of component (B) (Michael acceptor)

1,000 P of a glycidyl group-containing acrylate resin, prepared from styrene, glycidyl methacrylate and dimethyl maleate (epoxide equivalent weight 510), were dissolved in 680 P of xylene at 70° C., and 127 P of acrylic acid and 1 P of tetraethylammonium bromide were subsequently added. While passing air through the mixture, stirring was continued at 80° C. until the mixture had an acid number <1. The pale yellow solution had a solids content of 62.5%; C=C equivalent weight: 1,022.

C Preparation of the curable mixture/coatings

The amounts by weight of components (A) and (B) and of the catalyst which are given in the table below were mixed. After a spread time of 25 seconds had been set using butyl acetate in accordance with 4 DIN 53211/23° C., the coating material obtained was applied to glass plates in a wet-film thickness of 100 μm by means of an application doctor blade and cured at 60° C. for 30 minutes.

We claim:

1. A curing component (A) containing active CH groups, which contains at least two groups of the formula (I)

or structural units of the formula (I') or (I")

in which:
A denotes

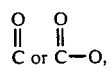

the latter group being bonded to the CH group via the carbon atom;
X and Y are identical or different and denote

CO₂R¹, CN, NO₂, CONH₂, CONR¹H or CONR¹R¹, where the R¹ radicals may be identical or different and represent a hydrocarbon radical, preferably an alkyl radical having 1 to 12 carbon atoms, which may also be interrupted by oxygen or an N-alkyl radical, with the proviso that only one of the two radicals X and Y may represent the NO₂ group;
A' denotes

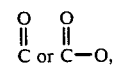

| Ex. | Component (A) Type | Amount (g) | Component (B) Amount (g) | Catalyst Type | Amount (g) | Gelling time (h) | Pendulum hardness (s) after 1 day | after 7 days | Gasoline resistance (min) after 7 days |
|---|---|---|---|---|---|---|---|---|---|
| 1 | A1 | 25.0 | 50.0 | TBAF | 1.30 | 5 | 80 | 130 | 30 |
| 1a* | A1 | 25.0 | 50.0 | TBAF | 1.30 | 5 | 70 | 199 | 30 |
| 2 | A2 | 35.8 | 50.0 | TBAF | 1.50 | 8 | 35 | 63 | 30 |
| 2a | A2 | 35.8 | 50.0 | TMG | 0.24 | 1 | 22 | 29 | 15 |
| 3 | A3 | 25.0 | 50.0 | TBAF | 1.30 | 16 | 48 | 155 | 30 |
| 3a* | A3 | 25.0 | 50.0 | TBAF | 1.30 | 16 | 36 | 122 | 15 |
| 3b | A3 | 25.0 | 50.0 | TMG | 0.22 | 3 | 95 | 103 | 15 |
| 4 | A4 | 22.5 | 50.0 | TBAF | 2.40 | 24 | 30 | 52 | 10 |
| 5 | A5 | 17.6 | 50.0 | TBAF | 2.20 | 24 | 61 | 97 | 15 |
| 6 | A6 | 18.7 | 50.0 | TBAF | 2.28 | 24 | 18 | 46 | 15 |
| 7 | A7 | 20.8 | 50.0 | TBAF | 2.40 | 24 | 14 | 77 | 5 |
| 8 | A8 | 36.7 | 50.0 | TMG | 2.06 | 24 | 37 | 85 | 5 |
| 9 | A9 | 59.1 | 50.0 | TBAF | 4.00 | 24 | 22 | 64 | 5 |
| 10* | A10 | 29.5 | 50.0 | TPP | 0.54 | 4 | 63 | 113 | 30 |
| 11* | A11 | 56.4 | 50.0 | TPP | 0.75 | 10 | 19 | 67 | 15 |

*Drying at room temperature
TBAF = Tetrabutylammonium fluoride
TMG = Tetramethylguanidine
TPP = Triphenylphosphine where the latter group is bonded to the CH group via the carbon atom;

X' and Y' are identical or different and denote

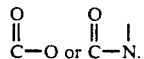

2. The curing component as claimed in claim 1, which has the formula (II)

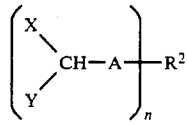

in which X, Y and A have the above meaning, $R^2$ represents the radical of a polyol $R^2(OH)_n$ (A=

or the radical of a polycarboxylic acid $R^2(CO_2H)_n$ (A=

and n denotes at least two.

3. A curing component as claimed in claim 2, wherein $R^2$ denotes the radical of a polyol having 2 to 12 carbon atoms, and n represents 2 to 4.

4. A curing component as claimed in claim 2, wherein $R^2$ denotes the radical of a polyol resin $R^2(OH)_n$ in which n is 2 to 200.

5. A curing component as claimed in claim 2, wherein $R^2$ represents the radical of a polycarboxylic acid $R^2(CO_2H)_n$ in which n is 2 to 4.

* * * * *